(12) United States Patent
Yamamoto et al.

(10) Patent No.: US 8,181,946 B2
(45) Date of Patent: May 22, 2012

(54) LIQUID ENCLOSING TYPE VIBRATION ISOLATING APPARATUS

(75) Inventors: Kentaro Yamamoto, Osaka (JP); Seiichi Hamate, Osaka (JP); Toshiyuki Kitano, Osaka (JP); Katsuhiro Sakurai, Nagoya (JP); Nobuya Yoshida, Toyota (JP)

(73) Assignees: Toyo Tire & Rubber Co., Ltd., Osaka-shi, Osaka (JP); Toyota Jidosha Kabushiki Kaisha, Toyota-shi (JP)

( * ) Notice: Subject to any disclaimer, the term of this patent is extended or adjusted under 35 U.S.C. 154(b) by 823 days.

(21) Appl. No.: 12/270,542

(22) Filed: Nov. 13, 2008

(65) Prior Publication Data

US 2009/0134556 A1 May 28, 2009

(30) Foreign Application Priority Data

Nov. 28, 2007 (JP) ................................ 2007-307975

(51) Int. Cl.
*F16F 5/00* (2006.01)
(52) U.S. Cl. .................... 267/140.13; 267/141.4
(58) Field of Classification Search ............ 267/140.13, 267/140.3, 219, 141, 141.1–141.4; 248/562, 248/636, 638
See application file for complete search history.

(56) References Cited

U.S. PATENT DOCUMENTS

| | | | |
|---|---|---|---|
| 4,762,309 A * | 8/1988 | Hutchins | 267/140.13 |
| 4,826,126 A * | 5/1989 | Katayama et al. | 267/140.13 |
| 5,333,847 A | 8/1994 | Kanda | |
| 6,257,562 B1 | 7/2001 | Takashima et al. | |
| 7,198,257 B2 * | 4/2007 | Nanno et al. | 267/140.13 |

FOREIGN PATENT DOCUMENTS

| | | |
|---|---|---|
| JP | 5-45280 U | 6/1993 |
| JP | 5-141473 A | 6/1993 |
| JP | 6-337035 A | 12/1994 |
| JP | 10-132014 A | 5/1998 |
| JP | 2004-162736 A | 6/2004 |
| JP | 2005-344937 A | 12/2005 |
| JP | 2006-002944 A | 1/2006 |
| JP | 2007-239824 A | 9/2007 |

OTHER PUBLICATIONS

Japanese Office Action dated Dec. 15, 2009, issued in corresponding Japanese Patent Application No. 2007-307975.
Japanese Office Action Dated Aug. 18, 2009, issued in corresponding Japanese Patent Application No. 2007-307975.

* cited by examiner

*Primary Examiner* — Melanie Torres Williams
(74) *Attorney, Agent, or Firm* — Westerman, Hattori, Daniels & Adrian, LLP

(57) ABSTRACT

To provide a liquid enclosing type vibration isolating apparatus capable of achieving two resonance characteristics by one orifice path, in a liquid enclosing type vibration isolating apparatus including a main liquid chamber a portion of a chamber wall of which is constituted by a vibration isolating base member, an auxiliary liquid chamber a portion of a chamber wall of which is constituted by a first diaphragm 18, and an orifice path for communicating the main liquid chamber and the auxiliary liquid chamber, an orifice member forming the orifice path is provided with a partition wall for partitioning the orifice path and the auxiliary liquid chamber, and a portion of the partition wall is constituted by a second diaphragm constituted by a flexible rubber-like elastic film facing the auxiliary liquid chamber.

4 Claims, 6 Drawing Sheets

LIQUID ENCLOSING TYPE VIBRATION ISOLATING APPARATUS

CROSS-REFERENCE TO RELATED APPLICATIONS

This application is based upon and claims the benefit of priority from the prior Japanese Patent Application No. 2007-307975, filed on Nov. 28, 2007; the entire contents of which are incorporated herein by reference.

BACKGROUND

The present invention relates to a liquid enclosing type vibration isolating apparatus.

As a vibration isolating apparatus of an engine mount or the like of supporting an automobile engine or the like so as not to transmit a vibration of a vibration source to a vehicle body side, there is known a liquid enclosing type vibration isolating apparatus. The liquid enclosing type vibration isolating apparatus comprises a first attaching piece attached to a vibration source side, a second attaching piece attached to a support side, a vibration isolating base member comprising a rubber-like elastic member interposed between the attaching pieces, a diaphragm comprising a rubber-like elastic film, a main liquid chamber a portion of a chamber wall of which is constituted by the vibration isolating base member, an auxiliary liquid chamber a portion of a chamber wall of which is constituted by the diaphragm, and an orifice path communicating the liquid chambers, and is constituted to achieve a vibration damping function and a vibration insulating function by a liquid flowing effect by the orifice path and a damping effect by the vibration isolating base member.

The vibration damping effect by the orifice path is limited to a certain constant frequency, and therefore, there is proposed a liquid enclosing type vibration isolating apparatus of a double orifice type provided with two orifice paths of an orifice path for shaking for damping a shaking vibration of a low frequency and an orifice path for idling for reducing an idling vibration at a higher frequency (refer to JP-A-2006-2944 (KOKAI), JP-A-2004-162736 (KOKAI) and JP-A-5-141473 (KOKAI)). By providing the two orifice paths in this way, resonance phenomena of a liquid in the respective orifice paths can be brought about, and therefore, two resonance characteristics can be achieved.

However, according to the double orifice type vibration isolating apparatus of the background arts, the orifice path for shaking and the orifice path for idling are provided separately from each other, and therefore, a structure of the vibration isolating apparatus becomes complicated and expensive. Further, a space for providing two of the orifice paths is needed, and the vibration isolating apparatus becomes large-sized.

In order to resolve the problems, JP-A-10-132014 (KOKAI) discloses that by holding an elastic member film at inside of a groove of a single orifice path with a gap therebetween, two of resonance characteristics are achieved by making a liquid flow through the gap between the elastic member film and the orifice path for a shaking vibration, further, by a flowing transmission of a liquid at inside of the orifice path by deforming the elastic member film for an idling vibration. However, in this case, it is necessary to make the liquid flow through the narrow gap constituted by the elastic member film, and a pressure loss is increased. Therefore, a sufficient damping function cannot be ensured.

Further, JP-A-2004-162736 (KOKAI) discloses a constitution in which in a double orifice type vibration isolating apparatus including two of orifice paths communicating a main liquid chamber and an auxiliary liquid chamber, in order to constitute the two orifice paths by a switching type by opening and closing one of the orifice paths, in a first orifice path provided along an inner peripheral wall of a main body metal piece in a cylindrical shape, an outer peripheral face of a portion thereof is exposed to outside by way of a rubber film, the first orifice is made to be able to close by providing pressing means for pressing the rubber film from an outer side. By providing such a rubber film portion, in a state of opening the first orifice, it is conceivable to make the rubber film portion function as a diaphragm. However, in this case, the rubber film portion faces the atmosphere of a constant pressure, and therefore, it is difficult to enlarge a pressure difference between inside of the orifice path and an outer side of the rubber film, and it is difficult to achieve a flowing effect of the orifice path.

SUMMARY

The invention has been made in view of the above-described point and it is an object thereof to provide a liquid enclosing type vibration isolating apparatus capable of achieving two resonance characteristics by one orifice path.

A liquid enclosing type vibration isolating apparatus according to the invention includes a first attaching piece to be attached to one of a vibration source side and a support side, a second attaching piece to be attached to other of the vibration source side and the support side, a vibration isolating base member comprising a rubber-like elastic member interposed between the first attaching piece and the second attaching piece, a first diaphragm comprising a rubber-like elastic member, a main liquid chamber a portion of a chamber wall of which is constituted by the vibration isolating base member and which is filled with a liquid, an auxiliary liquid chamber a portion of a chamber wall of which is constituted by the first diaphragm and which is filled with the liquid, and an orifice member forming an orifice path of communicating the main liquid chamber and the auxiliary liquid chamber by a main liquid chamber side opening opened to the main liquid chamber and an auxiliary liquid chamber side opening opened to the auxiliary liquid chamber, wherein the orifice member includes a partition wall for partitioning the orifice path and the main liquid chamber or the auxiliary liquid chamber, and the partition wall at a portion of the orifice path between the main liquid chamber side opening and the auxiliary liquid chamber side opening is constituted by a second diaphragm comprising a flexible rubber-like elastic film facing the main liquid chamber or the auxiliary liquid chamber.

A portion of the partition wall partitioning the orifice path and the liquid chamber is constituted by the flexible rubber-like elastic member at a portion of the orifice path in this way, and therefore, the rubber-like elastic film is made to function as the second diaphragm, while being the single orifice path, two resonance characteristics can be achieved. That is, there are achieved the two resonance characteristics of a resonance on a low frequency side by flowing of the liquid over an entire length of the orifice path, and a resonance on a high frequency side by partial flowing of the liquid at the orifice path by flexibly deforming the second diaphragm.

Further, the second diaphragm faces the liquid chamber, the liquid chamber is varied in a liquid pressure thereof by inputting a vibration to the vibration isolating apparatus, and therefore, in comparison with a case in which the second diaphragm faces the atmosphere, a pressure difference is easy to be produced on both sides interposing the second diaphragm, and therefore, a liquid flowing effect at the orifice path is easy to be achieved and a vibration isolating function can be promoted.

In the liquid enclosing type vibration isolating apparatus, there may be constructed a constitution in which the second attaching piece is constituted by a cylindrical shape, the first diaphragm is attached to the second attaching piece to form a liquid chamber filled with a liquid between the first diaphragm and the vibration isolating base member, the liquid chamber is partitioned to the main liquid chamber and the auxiliary liquid chamber by a dividing unit, and the dividing unit comprises the orifice member in a ring-like shape fitted to an inner side of a peripheral wall portion of the second attaching piece and forming the orifice path, and a dividing wall partitioning the main liquid chamber and the auxiliary liquid chamber in an axis direction on an inner side of the orifice member. Further, in that case, when the partition wall at a portion of the orifice path is provided with an opening portion opened to the main liquid chamber or the auxiliary liquid chamber, and the opening portion is closed by vulcanizing to mold a rubber film to thereby form the second diaphragm, the second diaphragm can be formed inexpensively by a simple structure.

Further, there may be constructed a constitution in which the second diaphragm is provided by a length in a peripheral direction of a half or more of a length in the peripheral direction of the orifice path in the orifice path formed along the peripheral direction of the orifice member, thereby, the second diaphragm can be made to be easy to flex by reducing a rigidity thereof.

According to the invention, the two resonance characteristics can be achieved by the one orifice path, and therefore, the vibration isolating apparatus having the double orifice characteristic can be provided by saving a space thereof and inexpensively.

DETAILED DESCRIPTION

An explanation will be given of an embodiment of the invention in reference to the drawings as follows.

Figure 1:
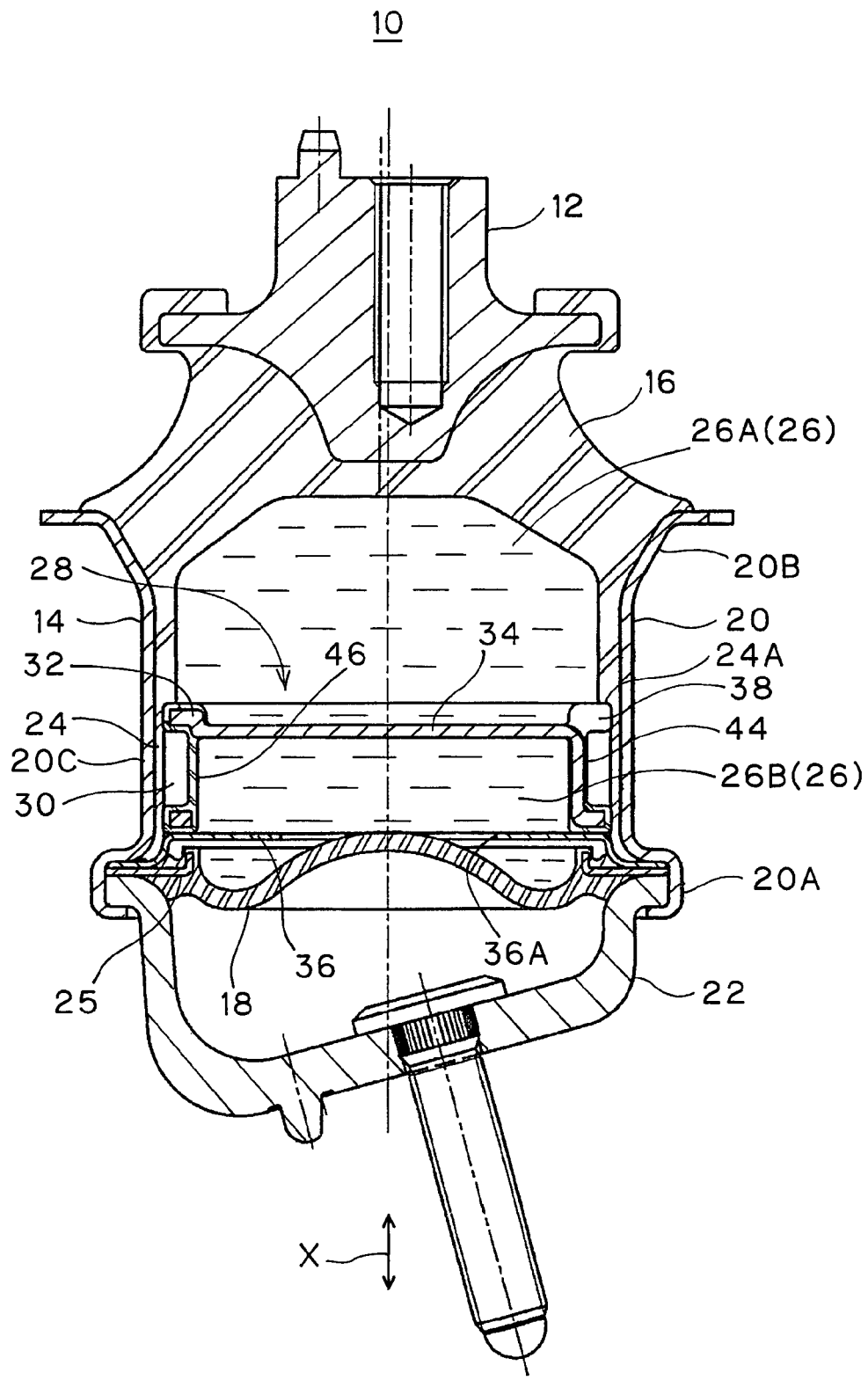
FIG. 1 is a vertical sectional view of a liquid enclosing type vibration isolating apparatus according to an embodiment.

FIG. 1 is a vertical sectional view of a liquid enclosing type vibration isolating apparatus 10 according to an embodiment. The vibration isolating apparatus 10 is an engine mount for supporting an engine of an automobile and is constituted by including a first attaching piece 12 on an upper side attached to a side of the engine constituting a vibration source, a second attaching piece 14 on a lower side constituting a cylindrical shape attached to a vehicle body on a support side, a vibration isolating base member 16 comprising a rubber elastic member interposed between the two attaching pieces 12, 14 for connecting the both members, and a first diaphragm 18 comprising a rubber-like elastic film attached to the second attaching piece 14 to be opposed to the vibration isolating base member 16.

The first attaching piece 12 is a boss metal piece arranged on an upper side of an axial center portion of the second attaching piece 14. The second attaching piece 14 is constituted by a cylindrical barrel portion 20 and a bottomed cylindrical portion 22 to fasten to a lower end portion 20A of the cylindrical barrel portion 20. The vibration isolating base member 16 is formed substantially by a shape of an umbrella, the first attaching piece 12 is vulcanized to adhere to an upper portion of the vibration isolating base member 16 in an embedded state, and an outer peripheral portion of a lower end thereof is vulcanized to adhere to an upper end opening portion 20B of the cylindrical barrel portion 20. A rubber layer 24 covering an inner peripheral face of the cylindrical barrel portion 20 is communicated with a lower end portion of the vibration isolating base member 16. The first diaphragm 18 includes a flexible rubber film, a reinforcing metal piece 25 in a ring-like shape is embedded to integrate with an outer peripheral portion thereof, and the reinforcing metal piece 25 is fixed to a portion for caulking to fasten the cylindrical barrel portion 20 and the bottomed cylindrical portion 22.

An inner side of the cylindrical barrel portion 20 is formed with a liquid chamber 26 filled with a liquid between a lower face of the vibration isolating base member 16 and the first diaphragm 18. The liquid chamber 26 is partitioned by a dividing unit 28 to a main liquid chamber 26A on an upper side a portion of a chamber wall of which is constituted by the vibration isolating base member 16, and an auxiliary liquid chamber 26B on a lower side a portion of a chamber wall of which is constituted by the first diaphragm 18. The two liquid chambers 26A, 26B are communicated to each other by a single orifice path 30.

The dividing unit 28 is constituted by a orifice member 32 in a ring-like shape forming the orifice path 30 by being fitted to an inner side of a peripheral wall portion 20C of the cylindrical barrel portion 20 by way of a rubber layer 24, and a dividing wall 34 for partitioning the main liquid chamber 26A and the auxiliary liquid chamber 26B in an axis direction X on an inner side of the orifice member 32. According to the example, the dividing wall 34 is integrally provided to the orifice member 32 by a rigid material of a synthetic resin, a metal or the like. Further in details, the dividing wall 34 is provided at an upper end portion of an outer peripheral portion 32A of the orifice member 32 as a portion in a shape of a circular plate for closing an inner peripheral face thereof, thereby, an inner side of the orifice member 32 is made to constitute the auxiliary liquid chamber 26B.

The orifice member 32 is held in a state of being squeezed between a stepped portion 24A provided at the rubber layer 24 and a partition receive plate 36 in the axis direction X by fixing the partition receive plate 36 in a shape of a circular plate having an opening portion 36A at a center thereof to a portion of caulking to fasten the cylindrical barrel portion 20 and the bottomed cylindrical portion 22 along with the reinforcing metal piece 25.

The orifice member 32 includes the outer peripheral portion 32A having a section in a shape of a channel opened to an outer side, by fitting the outer peripheral portion 32A to an inner peripheral face of the cylindrical barrel portion 20 by way of the rubber layer 24, the orifice path 30 extended along a peripheral direction C (refer to FIG. 4) is formed between the outer peripheral portion 32A and the inner peripheral face. As shown by FIGS. 1 through 4, the orifice path 30 includes a main liquid chamber side opening 38 opened to the main liquid chamber 26A at one end in the peripheral direction C, and includes an auxiliary liquid chamber side opening 40 opened to the auxiliary liquid chamber 26B at other end in the peripheral direction C, thereby, the main liquid chamber 26A and the auxiliary liquid chamber 26B are communicated. As shown by FIG. 4, the orifice path 30 is provided at the outer peripheral portion 32A of the orifice member 32 by a length of substantially ¾ periphery, and at a portion in a peripheral direction of the outer peripheral portion 32A excluding the orifice path 30 is formed with a shield wall 42 for preventing shortcircuit of the liquid by filling rubber to an inner side of the channel of the outer peripheral portion 32A.

The outer peripheral portion 32A of the orifice member 32 is provided with a partition wall 44 for partitioning the orifice path 30 and the auxiliary liquid chamber 26B. That is, the partition wall 44 is a wall portion for partitioning the orifice path 30 relative to the auxiliary liquid chamber 26B on the inner side, and constitutes a vertical wall in the channel-like shape of the outer peripheral portion 32A.

Further, the partition wall 44 at a portion of the orifice path 30 between the main liquid chamber side opening 38 and the auxiliary liquid chamber side opening 40 is constituted by a second diaphragm 46 comprising a flexible rubber film facing the auxiliary liquid chamber 26B. That is, by forming the partition wall 44 at a middle of the orifice path 30 by the flexible rubber film, the partition wall portion is constituted as the flexibly deformable second diaphragm 46.

Figure 2:
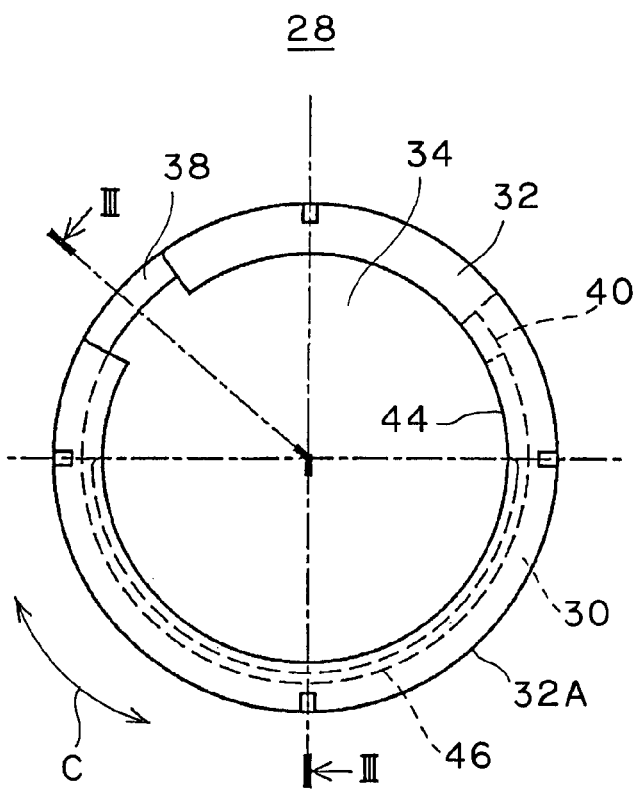
FIG. 2 is a plane view of a dividing unit of the vibration isolating apparatus.
Figure 3:
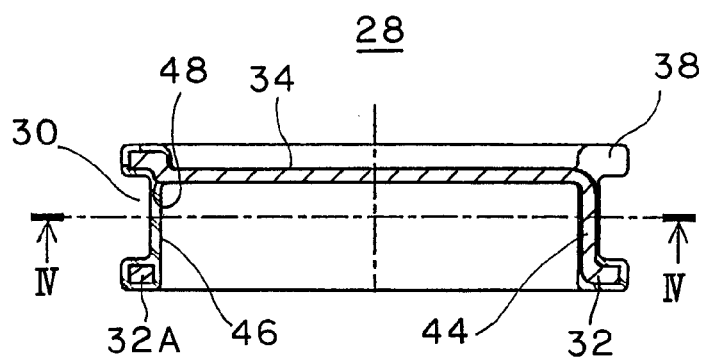
FIG. 3 is a sectional view taken along a line III-III of FIG. 2.
Figure 4:
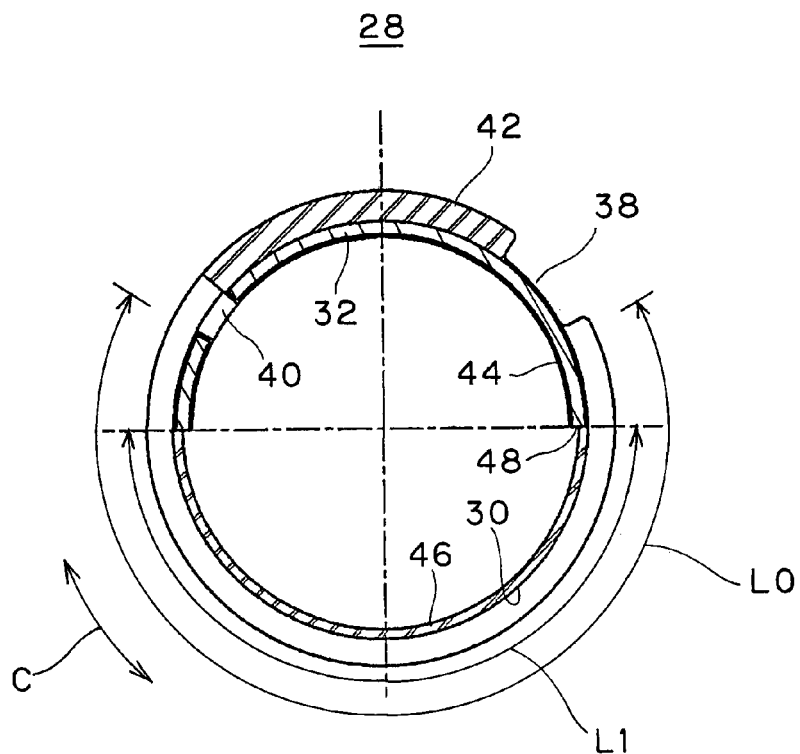
FIG. 4 is a sectional view taken along a line IV-IV of FIG. 3.

In details, as shown by FIGS. 2 through 4, at the partition wall 44 at a portion in the peripheral direction of the orifice path 30, an opening portion 48 opened to the auxiliary liquid chamber 26B on the inner side is notched to form, and the second diaphragm 46 is formed by vulcanizing to mold to close the opening portion 48 by a rubber film continuous from the shield wall 42. The second diaphragm 46 is provided by a shape of a circular arc in a section thereof (refer to FIG. 4) such that a sectional area of the orifice path 30 on the outer side of the second diaphragm 46 becomes constant.

The second diaphragm 46 is provided by a length L1 in a peripheral direction of a half or more of a length L0 in the peripheral direction of the orifice path 30. According to the example, whereas the length L0 in the peripheral direction of the orifice path 30 is substantially ¾ periphery, the length L1 in the peripheral direction of the second diaphragm 46 is provided by ½ periphery. By setting the length L1 in the peripheral direction of the second diaphragm 46 to be long in this way, the second diaphragm 46 can be made to be easy to flex by reducing a rigidity thereof.

According to the embodiment constituted by the above-described, a portion of the partition wall 44 partitioning the auxiliary liquid chamber 26B of the middle of the orifice path 30 is constituted as the flexible second diaphragm 46, and therefore, while being the single orifice path 30, two of resonance characteristics can be achieved. That is, with regard to a shaking vibration in a low frequency region around 10 Hz, as shown by notation S in FIG. 5, the shaking vibration can be damped by bringing about a resonance phenomenon by flowing of the liquid over an entire length of the orifice path 30. Further, with regard to an idling vibration at a high frequency region at around 40 Hz, as shown by notation I in FIG. 5, low dynamic spring constant formation of the idling vibration can be achieved by bringing about a resonance phenomenon by partial flowing of the liquid of the orifice path 30 by flexibly deforming the second diaphragm 46. In the case of the idling vibration, a length reaching the second diaphragm 46 from the main liquid chamber side opening 38 constitutes an effective orifice length, and therefore, a resonance frequency can pertinently be set by adjusting the length.

Figure 6:
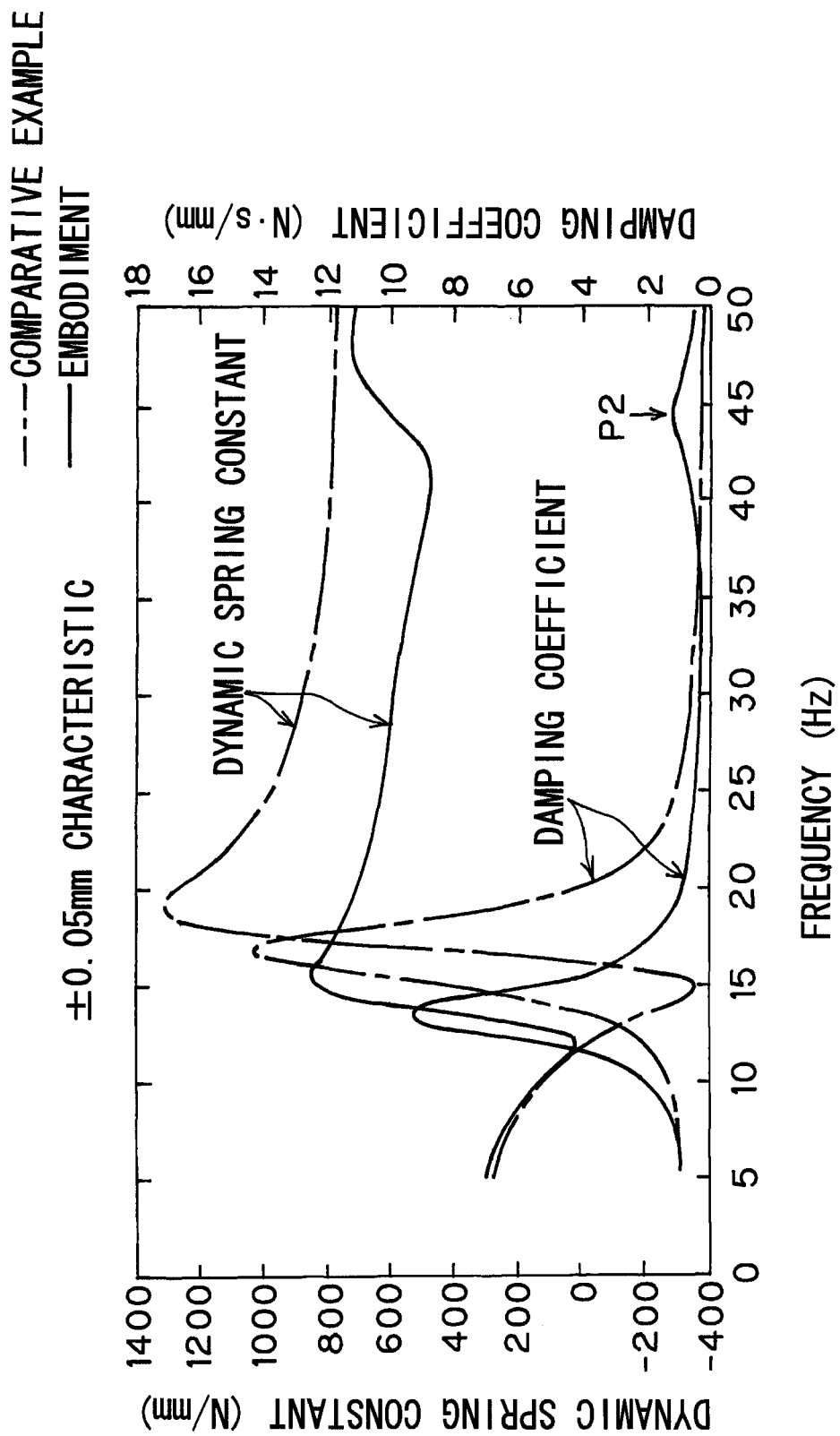
FIG. 6 is a graph showing a relationship among a frequency and a dynamic spring constant and a damping coefficient in inputting a small amplitude.
Figure 7:
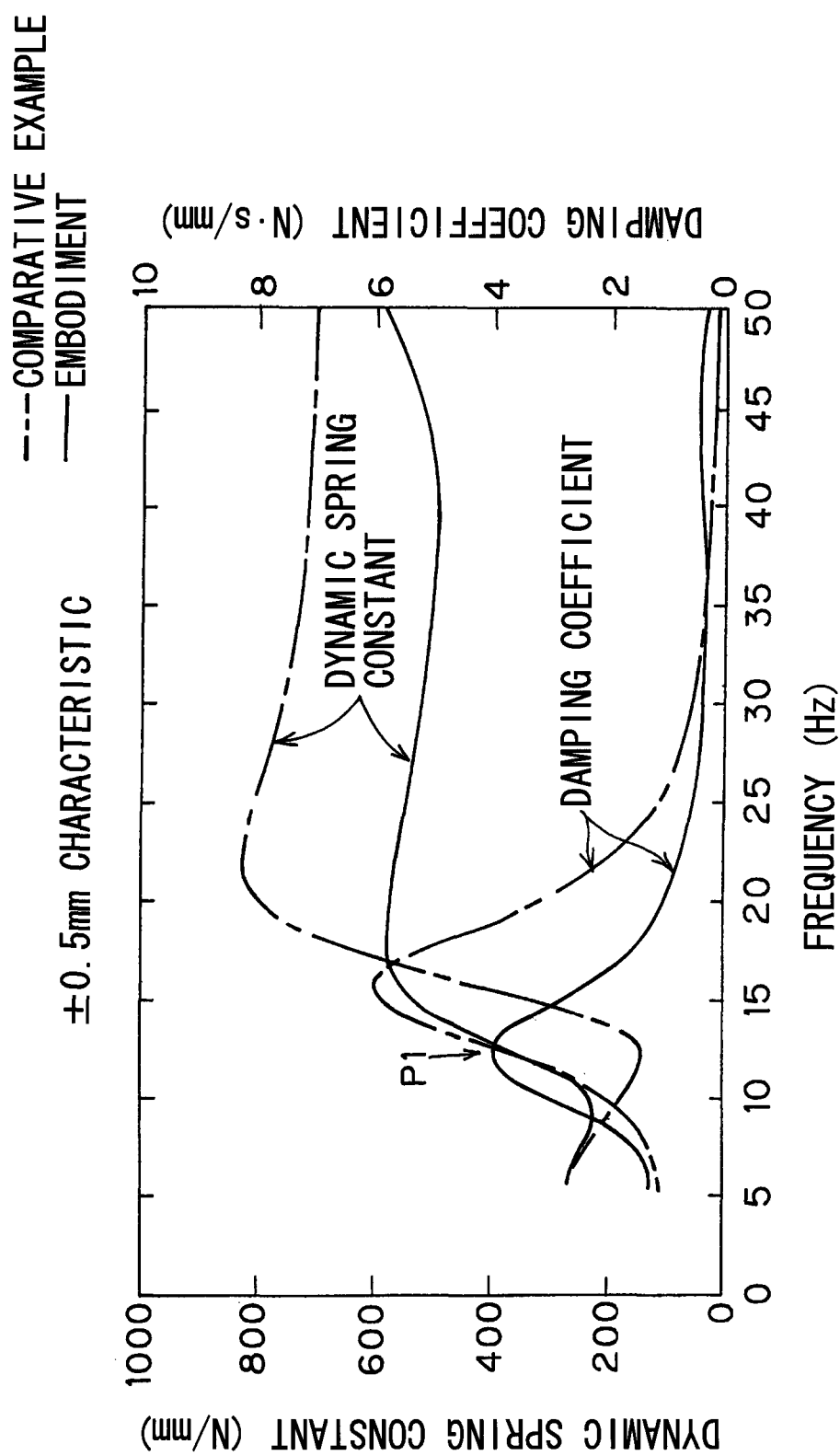
FIG. 7 is a graph showing a relationship among the frequency and the dynamic spring constant and the damping coefficient in inputting a large amplitude.

FIG. 6 is a graph showing a relationship among a frequency and a dynamic spring constant and a damping coefficient in inputting a small amplitude in correspondence with an idling vibration, and FIG. 7 is a graph showing a relationship among a frequency and a dynamic spring constant and a damping coefficient in inputting a large amplitude in correspondence with a shaking vibration. As shown by FIG. 7, according to the embodiment, a damping peak P1 in 10 through 15 Hz is shown for the shaking vibration, further, as shown by FIG. 6, a damping peak P2 around 45 Hz is shown for the idling vibration, and an effect of reducing the dynamic spring constant at a vicinity of 40 Hz is shown in correspondence therewith. In contrast thereto, in a comparative example which is not provided with the second diaphragm 46, although a damping peak around 10 Hz is high, a resonance at other portion is not observed and a vibration isolating effect of the idling vibration cannot be achieved.

According to the embodiment, the second diaphragm 46 faces the auxiliary liquid chamber 26B, and therefore, in comparison with a case of facing outer air having the constant atmospheric pressure, a pressure difference between both sides interposing the second diaphragm 46 is increased, and therefore, a liquid flowing effect at the orifice path 30 is easy to achieve for the idling vibration operated with the second diaphragm 46 and the vibration isolating function for the idling vibration can be promoted.

As described above, according to the embodiment, the double orifice characteristic can be achieved by a space equivalent to that of the single orifice structure of the related art, and therefore, space saving formation can be realized and small-sized formation can be achieved. Further, by only vulcanizing to mold the rubber film at the orifice member 32, the double orifice characteristic can be realized, which is inexpensive.

Figure 8:
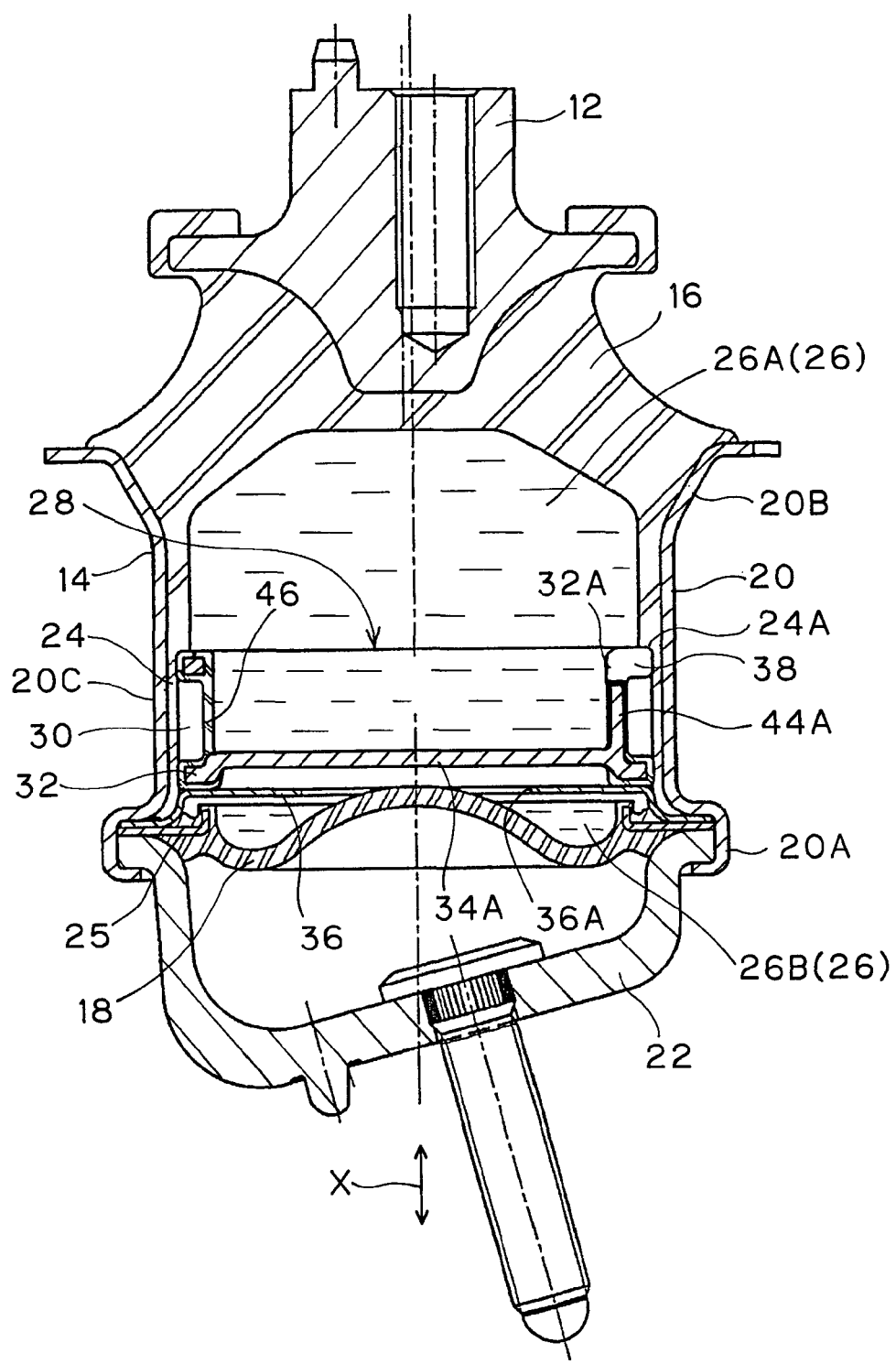
FIG. 8 is a vertical sectional view of a liquid enclosing type vibration isolating apparatus according to other embodiment.

Although according to the embodiment, the second diaphragm 46 is constituted to face the auxiliary liquid chamber 26B, as shown by FIG. 8, the second diaphragm 46 may face the main liquid chamber 26A.

In an example of FIG. 8, a dividing wall 34A is provided as a portion in a shape of a circular plate closing an inner peripheral face of the orifice member 32 at a lower end portion of the outer peripheral portion 32A of the orifice member 32, thereby, the inner side of the orifice member 32 is made to constitute the main liquid chamber 26A. Therefore, according to the example, the outer peripheral portion 32A of the orifice member 32 is provided with a partition wall 44A for partitioning the orifice path 30 and the main liquid chamber 26A. Further, a portion of the partition wall 44A is constituted by the second diaphragm 46 facing the main liquid chamber 26A. The other constitution is similar to that of the above-described embodiment.

Figure 5:
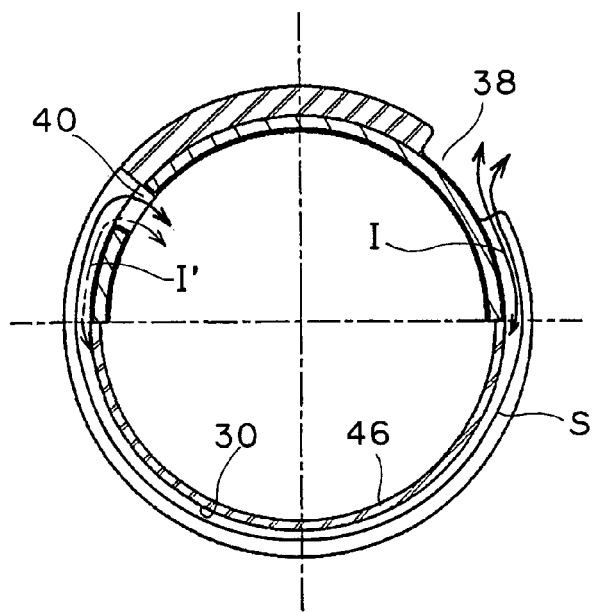
FIG. 5 is an explanatory view showing an orifice constitution of the dividing unit.

In the example of FIG. 8, a portion of the partition wall 44A partitioning the main liquid chamber 26A at a middle of the orifice path 30 is constituted as the flexible second diaphragm 46, and therefore, as shown by notation I' in FIG. 5, low dynamic spring constant formation of the idling vibration can be achieved by bringing about a resonance phenomenon by partial flowing of the liquid of the orifice path 30 by flexibly deforming the second diaphragm 46 by constituting an effective orifice length by the length reaching the second diaphragm 46 from the auxiliary liquid chamber side opening 40 for the idling vibration. With regard to the shaking vibration, the same goes with the above-described embodiment, and therefore, also in this case, while being the single orifice path 30, two resonance characteristics can be achieved.

Further, a shape of the second diaphragm 46 is pertinently set in accordance with a required characteristic and is not limited to that of the above-described embodiment. Further, although according to the embodiment, there is constructed a constitution of providing the second diaphragm 46 for the vibration isolating apparatus having the single orifice path, a third resonance characteristic can also be added by further providing other orifice path and other diaphragm. Further, although according to the above-described embodiment, an object is constituted by the shaking vibration and the idling vibration, the invention is not limited thereto but is applicable also to various vibrations having different frequencies. Further, the invention may be applied to a circular cylinder type liquid enclosing type vibration isolating apparatus constituted by coupling an interval of an inner cylinder and an outer cylinder by a vibration isolating base member. Further, the invention is applicable to various vibration isolating apparatus of a body mount, a differential mount or the like other than the engine mount. Otherwise, the invention can variously be modified so far as not deviated from the gist of the invention although not enumerated one by one.

What is claimed is:

1. A liquid enclosing type vibration isolating apparatus comprising:
    a first attaching piece to be attached to one of a vibration source side and a support side;
    a second attaching piece to be attached to other of the vibration source side and the support side;
    a vibration isolating base member comprising an elastic member interposed between the first attaching piece and the second attaching piece;
    a first diaphragm comprising an elastic member;
    a main liquid chamber a portion of a chamber wall of which is constituted by the vibration isolating base member and which is filled with a liquid;
    an auxiliary liquid chamber a portion of a chamber wall of which is constituted by the first diaphragm and which is filled with the liquid; and
    an orifice member forming an orifice path of communicating the main liquid chamber and the auxiliary liquid chamber by a main liquid chamber side opening opened to the main liquid chamber and an auxiliary liquid chamber side opening opened to the auxiliary liquid chamber;
    wherein the orifice member includes a partition wall for partitioning the orifice path and the main liquid chamber or the auxiliary liquid chamber, and the partition wall at a portion of the orifice path between the main liquid chamber side opening and the auxiliary liquid chamber side opening is constituted by a second diaphragm comprising a flexible elastic film facing the main liquid chamber or the auxiliary liquid chamber,
    wherein the second diaphragm partitions the orifice path and the main liquid chamber or the auxiliary liquid chamber;
    wherein the partition wall at a portion of the orifice path is provided with an opening portion opened to the main liquid chamber or the auxiliary liquid chamber, and
    wherein the second diaphragm is formed by fixing the flexible elastic film over the whole periphery of the opening portion so as to close the opening portion.

2. The liquid enclosing type vibration isolating apparatus according to claim 1, wherein the second attaching piece is constituted by a cylindrical shape, the first diaphragm is attached to the second attaching piece to form a liquid chamber filled with a liquid between the first diaphragm and the vibration isolating base member, the liquid chamber is partitioned to the main liquid chamber and the auxiliary liquid chamber by the dividing unit, and the dividing unit comprises the orifice member in a ring shape fitted to an inner side of a peripheral wall portion of the second attaching piece and forming the orifice path, and a dividing wall partitioning the main liquid chamber and the auxiliary liquid chamber in an axis direction on an inner side of the orifice member.

3. The liquid enclosing type vibration isolating apparatus according to claim 2, wherein the partition wall at a portion of the orifice path is provided with an opening portion opened to the main liquid chamber or the auxiliary liquid chamber, and the opening portion is closed by vulcanizing to mold a rubber film to thereby form the second diaphragm.

4. The liquid enclosing type vibration isolating apparatus according to claim 2, wherein the second diaphragm is provided by a length in a peripheral direction of a half or more of a length in the peripheral direction of the orifice path in the orifice path formed along the peripheral direction of the orifice member.

* * * * *